US012770094B2

(12) United States Patent
Makler et al.

(10) Patent No.: US 12,770,094 B2
(45) Date of Patent: Oct. 20, 2026

(54) FORECASTING USING FUZZY KERNELS IN CONVOLUTIONAL NEURAL NETWORKS

(71) Applicant: Dell Products L.P., Round Rock, TX (US)

(72) Inventors: Lev Makler, Be'er Sheva (IL); Ofir Ezrielev, Be'er Sheva (IL); Anat Parush Tzur, Tel Aviv (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/622,002

(22) Filed: Mar. 29, 2024

(65) Prior Publication Data

US 2025/0307755 A1 Oct. 2, 2025

(51) Int. Cl.
*G06Q 10/0835* (2023.01)

(52) U.S. Cl.
CPC ................................ *G06Q 10/0835* (2013.01)

(58) Field of Classification Search
CPC .................................................. G06Q 10/0835
USPC .................................................. 705/336, 1.1
See application file for complete search history.

(56) References Cited

U.S. PATENT DOCUMENTS

2003/0069818 A1 4/2003 Menninger
2022/0067510 A1* 3/2022 Jayakumar .............. G06N 3/08
2024/0047042 A1 2/2024 Daza
2024/0311619 A1 9/2024 Licato
2024/0370734 A1 11/2024 Kumar
2025/0028746 A1 1/2025 Cantu
2025/0028905 A1 1/2025 Atashbar
2025/0086737 A1 3/2025 Walters
2025/0094821 A1 3/2025 Hettige
2025/0095642 A1 3/2025 Ghose
2025/0190763 A1 6/2025 Banuelos
2025/0232872 A1 7/2025 Natarajan
(Continued)

FOREIGN PATENT DOCUMENTS

JP 7218444 B2 * 2/2023 ........... H04W 24/08
WO WO-2022072863 A1 * 4/2022 ............ G06N 3/047
(Continued)

OTHER PUBLICATIONS

Zahid, Maheen et al. "Electricity Price and Load Forecasting Using Enhanced Convolutional Neural Network and Enhanced Support Vector Regression in Smart Grids." Electronics (Basel) 8.2 (2019): 122—. Web. (Year: 2019).*
(Continued)

*Primary Examiner* — Akiba K Robinson
(74) *Attorney, Agent, or Firm* — WOMBLE BOND DICKINSON (US) LLP

(57) ABSTRACT

Methods and systems for forecasting changes in quantities over time are disclosed. To generate a prediction for a future value of a quantity based on time series data of the quantity that may have irregular time intervals, a fuzzy kernel may be used in a convolutional neural network. The fuzzy kernel may be a continuous function adapted to indicate an effect that a time point has on the quantity. Use of the fuzzy kernel may enable the convolutional neural network to perform convolution operations on the time series data to obtain a prediction without binning the time series data.

20 Claims, 7 Drawing Sheets

(56) References Cited

U.S. PATENT DOCUMENTS

2025/0238623 A1 7/2025 Jin
2025/0284721 A1 9/2025 Agrawal

FOREIGN PATENT DOCUMENTS

WO WO-2022245936 A1 * 11/2022 ............ G06V 20/58
WO WO-2024086537 A1 * 4/2024 ............ G16H 40/67

OTHER PUBLICATIONS

Korpusik, Mandy, and James Glass. "Convolutional Neural Networks for Dialogue State Tracking without Pre-Trained Word Vectors or Semantic Dictionaries." 2018 IEEE Spoken Language Technology Workshop (SLT). IEEE, 2018. 884-891. Web. (Year: 2018).*
Zhao, Di, Feng Zhao, and Yongjin Gan. "Reference-Driven Compressed Sensing MR Image Reconstruction Using Deep Convolutional Neural Networks without Pre-Training." Sensors (Basel, Switzerland) 20.1 (2020): 308. Web. (Year: 2020).*
Korpusik;, "Convolutional Neural Networks for Dialogue State Tracking without Pre-Trained Word Vectors or Semantic Dictionaries", 2019, IEEE (Year: 2019).*
Filho, Marion, "Ensemble Time Series Forecasting in Python Made Easy with AutoGluon," Forecastegy, Apr. 224, 2023, Web Page <https://forecastegy.com/posts/ensemble-time-series-forecasting-python-autogluon/> accessed on Mar. 29, 2024. (13 Pages).
"Understanding Explainable AI (XAI) for classification, regression and clustering with Python," Shedload of Code, Jul. 8, 2023, Web Page <https://www.shedloadofcode.com/blog/understanding-explainable-ai-for-classification-regression-and-clustering-with-python> accessed on Mar. 29, 2023. (44 Pages).
Zheng, Yi, et al., "Time series classification using multi-channels deep convolutional neural networks." International conference on web-age information management. Cham: Springer International Publishing, 2014. (13 Pages).
Yang, Jian Bo, et al., "Deep convolutional neural networks on multichannel time series for human activity recognition." Ijcai. vol. 15. 2015. (7 Pages).
Bozorgtabar, Behzad, et al., "Anomaly Detection and Localization Using Attention-Guided Synthetic Anomaly and Test-Time Adaptation." BMVC. 2022. (14 Pages).
Zhang, Qianqian, et al., "Video anomaly detection based on attention mechanism." Symmetry 15.2 (2023): 528. (14 Pages).
Hu, Wanting, et al., "Research on Anomaly Network Detection Based on Self-Attention Mechanism." Sensors 23.11 (2023): 5059. (25 Pages).
Yuan, Xingdi, et al., "Selecting better samples from pre-trained LLMs: a case study on question generation." arXiv preprint arXiv:2209.11000 (2022). (12 Pages).
Amyeen, Rubaba, "Prompt-Engineering and Transformer-based Question Generation and Evaluation." arXiv preprint arXiv:2310.18867 (2023). (8 Pages).
Uehara, Kohei, et al., "K-vqg: Knowledge-aware visual question generation for common-sense acquisition." Proceedings of the IEEE/CVF Winter Conference on Applications of Computer Vision. 2023. (15 Pages).
Feldt, Leonard S., et al., "Statistical inference for coefficient alpha." Applied psychological measurement 11.1 (1987): 93-103. (11 Pages).
Green, Samuel B., et al., "Use of internal consistency coefficients for estimating reliability of experimental task scores." Psychonomic bulletin & review 23 (2016): 750-763. (14 Pages).
Koo, Terry K., et al., "A guideline of selecting and reporting intraclass correlation coefficients for reliability research." Journal of chiropractic medicine 15.2 (2016): 155-163. (13 Pages).
Kiciman, Emre, et al., "Causal reasoning and large language models: Opening a new frontier for causality." arXiv preprint arXiv:2305.00050 (2023). (62 Pages).
Long, Stephanie, et al., "Can large language models build causal graphs?. " arXiv preprint arXiv:2303.05279 (2023). (8 Pages).
Fan, Caoyun, et al., "Accurate use of label dependency in multi-label text classification through the lens of causality." Applied Intelligence 53.19 (2023): 21841-21857. (28 Pages).
Xie, Xiao, et al., "A visual analytics approach for exploratory causal analysis: Exploration, validation, and applications." IEEE Transactions on Visualization and Computer Graphics 27.2 (2020): 1448-1458. (11 Pages).
Røysland, Kjetil, "Counterfactual analyses with graphical models based on local independence." (2012): 2162-2194. (34 :ages).

* cited by examiner

FORECASTING USING FUZZY KERNELS IN CONVOLUTIONAL NEURAL NETWORKS

FIELD

Embodiments disclosed herein relate generally to forecasting changes in quantities over time. More particularly, embodiments disclosed herein relate to forecasting changes in quantities over time using a fuzzy kernel in a convolutional neural network.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
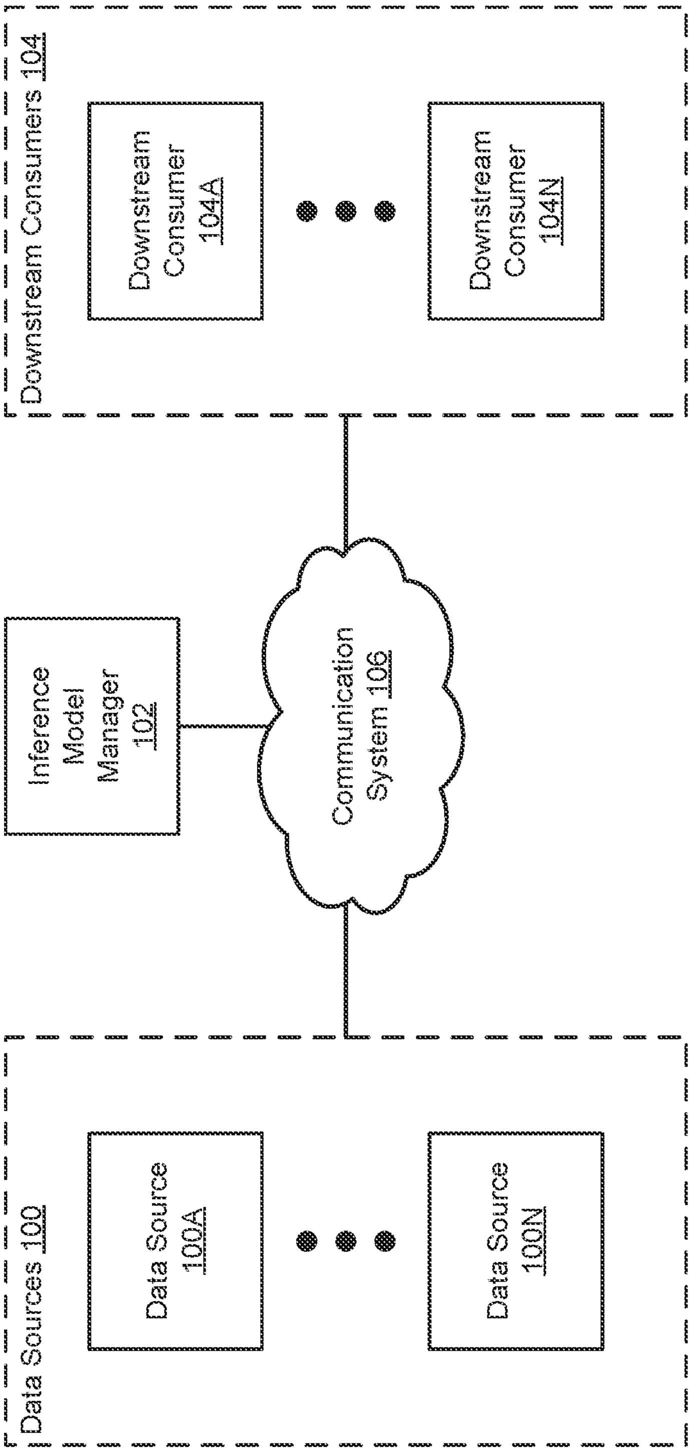
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to forecasting changes in quantities over time. To forecast changes in quantities over time, a convolutional neural network may ingest input data from any number of data sources and may provide predictions to any number of downstream consumers. The downstream consumers may provide computer-implemented services and/or make decisions based on the predictions.

A convolutional neural network may ingest input data and perform convolution operations for training and/or providing predictions. The input data may include samples of a quantity collected over a period of time and stored as time series data. To perform the convolution operations, the convolutional neural network may utilize a kernel to perform mathematical operations on the input data (e.g., compute products between a weight of the kernel and values of the input data). To do so, the kernel may require a certain structure of the input data (e.g., discrete data).

Because the samples of the quantity may not be collected in accordance with a fixed schedule, the time series data may have irregular time intervals between samples. For example, the samples may be collected when orders may be placed, when invoices may be generated, when financial reports may be requested, and/or any other events that may occur at various irregular times. The time series data may be pre-processed to fit the certain structure required for the kernel to perform mathematical operations on the time series data. For example, the time series data may be binned to group continuous values in the time series data into a discrete number of bins that may have regular intervals, samples in the times series data may be aggregated, and/or any other methods of data pre-processing may be performed.

However, pre-processing the time series data with irregular time intervals between samples may cause information loss and therefore reduce a predictive capability of a convolutional neural network using the pre-processed time series data. Reduced predictive capability may negatively impact a quality and/or availability of the computer-implemented services provided by downstream consumers.

To enable a convolutional neural network to train and/or forecast using time series data with irregular time intervals, a fuzzy kernel may be utilized. The fuzzy kernel may utilize a continuous function adapted to indicate an effect that a time point has on a quantity at the time point. Because the fuzzy kernel may not require a certain structure of the input data (e.g., time series data with fixed sampling) for operation, the convolutional neural network may utilize the fuzzy kernel to perform convolution operations without binning the time series data with irregular time intervals.

For example, a first continuous function may be initialized to be used as a fuzzy kernel in a convolutional neural network. The convolutional neural network may be trained based on time series training data (e.g., historic samples of a quantity collected at irregular time intervals over a period of time). During training of the convolutional neural network, learning may be performed through any type or number of convolution layers to obtain an output indicating modifications to the parameters of the convolutional neural network and to the first continuous function. The output may be optimized using an optimization method (e.g., gradient descent) to obtain a trained convolutional neural network and a fuzzy kernel for the quantity.

When a request for a future value of the quantity and second time series data with irregular time intervals for the quantity are obtained, the second time series data may be provided to the trained convolutional neural network as input data. The trained convolutional neural network may ingest the input data and perform convolution operations using the fuzzy kernel and the input data to obtain a prediction for a future value of the quantity.

Thus, embodiments disclosed herein may provide an improved method for forecasting changes in quantities over time by using a fuzzy kernel that enables a convolutional neural network to generate predictions based on time series data of samples of the quantities that may have irregular time intervals. Consequently, a quality and/or reliability of the computer-implemented services using the predictions may be improved.

In an embodiment, a method for forecasting changes in quantities over time is provided. The method may include, responsive to a request for a future value of a quantity of the quantities, (i) obtaining time series data for the quantity, the time series data comprising samples of the quantity at irregular time intervals over a period of time; (ii) processing the time series data using a trained convolutional neural network to obtain a prediction, the convolutional neural network utilizing a fuzzy kernel to obtain the prediction without binning the time series data; and (iii) providing the prediction to a downstream consumer for use in providing computer-implemented services.

The method may further include, prior to obtaining the time series data for the quantity, (i) initializing a first continuous function; (ii) obtaining times series training data, the time series training data comprising historic samples of the quantity collected at second irregular time intervals; and (iii) training a convolutional neural network based on the time series training data to obtain a trained convolutional neural network.

Training the convolutional neural network may include (i) obtaining a convolutional neural network architecture, the convolutional neural network architecture including parameters of a convolutional neural network; (ii) ingesting the time series training data into the convolutional neural network; (iii) performing learning using the convolutional neural network, the first continuous function, and the time series training data to obtain an output, the output comprising modifications to the parameters of the convolutional neural network and to the first continuous function; and (iv) optimizing the output to obtain a trained convolutional neural network and the fuzzy kernel.

The fuzzy kernel for the quantity may be a continuous function adapted to indicate an effect that a time point has on the quantity at the time point.

The fuzzy kernel may weight effects for different points in time more highly for the different time points that are closer to a current time point.

The prediction may indicate a condition impacting a business at a future point in time.

The condition impacting the business at the future point in time may be a change in availability of a supply of a product from a supplier.

The quantities may include at least one time of quantity selected from a group of types of quantities including (i) lead times of a supplier, (ii) revenue of a supplier, (iii) inventory of a material; and (iv) products sales.

The irregular time intervals may be varying durations of time between collection of the samples of the quantity.

The varying durations of time between collection of the samples of the quantity may be a result of the collection of the samples not being in accordance with a fixed schedule.

Processing the time series data may include: (i) ingesting the times series data into an input layer of the trained convolutional neural network; (ii) performing convolution operations in a plurality of convolution layers of the trained convolutional neural network to obtain outputs from each of the plurality of convolution layers, the convolution operations being a function of the input layer and the fuzzy kernel; (iii) normalizing, as the outputs are generated, the outputs to obtain normalized outputs, and at least a portion of the normalized outputs also be inputs for some of the plurality of convolution layers during the convolution operations; and (iv) propagating the normalized output through the plurality of convolution layers to obtain a prediction.

The fuzzy kernel may not require time series data with fixed sampling for operation.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer-implemented services that may utilize inference models as part of the provided computer-implemented services.

The inference models may be convolutional neural networks that may be used for various purposes. For example, the inference models may be trained to recognize patterns in data, automate tasks, and/or generate predictions usable to make decisions.

To provide the computer-implemented services, the system of FIG. 1 may include data sources 100, inference model manager 102, and downstream consumers 104. The computer-implemented services may be provided by one or more components of the system of FIG. 1, and/or any other types of devices (e.g., not shown in FIG. 1). Any of the computer-implemented services may be performed, at least in part, using inference models and/or inferences obtained with the inference models.

Data sources 100 may include any number of data sources (100A-100N) that may (i) obtain time series training data usable to train convolutional neural networks, and/or (ii) provide time series data that is ingestible into trained convolutional neural networks to obtain corresponding inferences. The time series training data may include historic samples of a quantity collected by data sources 100.

Inference model manager 102 may include any number of devices (e.g., data processing systems) and may be responsible for managing convolutional neural networks. Inference model manager 102 may: (i) obtain the time series training data from data sources 100 for use as ingest data for the convolutional neural networks, (ii) oversee training processes for the convolutional neural networks, (iii) host and operate the convolutional neural networks, (iv) obtain outputs from the convolutional neural networks, and/or (v) provide the outputs to another entity responsible for processing the outputs.

To operate the convolutional neural networks, inference model manager 102 may utilize a kernel to perform any number or types of convolution operations on the input data (e.g., compute products between a weight of the kernel and values of the input data). However, if the input data obtained from data sources 100 has irregular time intervals (e.g., varying durations of time between collection of the samples of the quantity), inference model manager 102 may be unable to operate a convolutional neural network using the input data with irregular time intervals directly.

For example, the kernel may require the input data to have regular time intervals (e.g., time series data with fixed sampling rates). To meet the requirements of the kernel, inference model manager 102 may pre-process the time series input data (e.g., discretize the input data via binning)

prior to performing convolution operations in the convolutional neural network. When doing so, information may be lost, which may reduce a predictive capability of the convolutional neural network. A reduced predictive capability of the convolutional neural network may negatively impact computer-implemented services provided to and/or by downstream consumers 104.

In general, embodiments disclosed here relate to systems and methods for forecasting changes in quantities over time. To forecast changes in quantities over time, a convolutional neural network may utilize a fuzzy kernel that enables the convolutional neural network to generate predictions based on time series data of samples of the quantities that may have irregular time intervals.

Inference model manager 102 may manage any number of convolutional neural networks that may utilize fuzzy kernels. As part of managing the convolutional neural networks, inference model manager 102 may oversee training processes for the convolutional neural networks.

To oversee a training process for a convolutional neural network, inference model manager 102 may obtain time series training data for a quantity of the quantities from data sources 100. The time series training data may include historic samples of the quantity collected at second irregular time intervals (e.g., that may be different than the irregular time intervals of the time series data of the quantity used to generate predictions). The time series training data with second irregular time intervals may be usable to train a convolutional neural network without pre-processing the time series training data (e.g., discretizing the time series training data via binning) by utilizing a fuzzy kernel in the convolutional neural network.

Inference manager 102 may obtain a convolutional neural network architecture. The convolutional neural network architecture may include parameters (e.g., prior samples, filters, activation function, number of layers, etc.) of a convolutional neural network. Additionally, inference manager 104 may initialize a first continuous function to be used as a fuzzy kernel in the convolutional neural network architecture. The first continuous function may be a user-defined function (e.g., a polynomial equation with defined terms) or may be generated (e.g., regression). The first continuous function may indicate an effect that a time point of the time series training data has on the quantity at the time point. Inference model manager 104 may ingest the time series training data as input data to train the convolutional neural network.

To train the convolutional neural network, inference model manager 104 may perform learning using the convolutional neural network architecture, the first continuous function, and the input data. During learning, the convolutional neural network may perform any number or types of convolution operations on the input data using the first continuous function. For example, the convolution operations may include (i) performing a mathematical operation (e.g., multiplication) between a time point of the input data and the first continuous function, (ii) identifying a level of quality (e.g., accuracy) compared to a target value of the labeled time series training data, (iii) modifying a parameter of the convolutional neural network architecture and/or the first continuous function to improve the level of quality (e.g., backpropagation), (iv) providing an output to a next layer of the convolutional neural network, and/or any other processes. The result of the training may be a trained convolutional neural network and a fuzzy kernel for the quantity.

When a request for a future value of a quantity is received, inference model manager 104 may obtain and time series data for the quantity that may have irregular time intervals from data sources 100. The request may include, for example, a desired future time interval, desired number of time points, and/or any other requests for a future condition of the quantity. Inference model manager 104 may feed the time series data as input data to the trained convolutional neural network for the quantity and obtain the fuzzy kernel for the quantity. Using the trained convolutional neural network and the fuzzy kernel, inference model manager 104 may generate a prediction for the request for the future value of the quantity.

The prediction may be provided to downstream consumers 104. Downstream consumers 104 may use the prediction to provide computer-implemented services and/or make decisions based on the prediction.

By utilizing fuzzy kernels that are continuous functions, convolutional neural networks may be more likely to generate accurate predictions based on time series data of quantities with irregular time intervals when compared to approaches that utilize pre-processed (e.g., binned) time series data. Consequently, a quality and/or reliability of the computer-implemented services based on the predictions may be improved.

To provide the above noted functionality, the system may include data sources 100, inference model manager 102, and downstream consumers 104. Each of these components is discussed below.

Data sources 100 may include any number and/or type of data sources. Data sources 100 may include, for example, data collectors, data aggregators, data repositories, and/or any other entity responsible for providing training data and/or input data to inference models. Data sources 100 may provide time series data services. To provide time series data services, data sources 100 may collect time series data, and prepare time series training data. To collect time series data for a quantity, data sources 100 may (i) obtain historic time series data, (ii) record samples of the quantity at various times, (iii) store time series data, and/or any other processes. To prepare time series training data, data sources 100 may (i) label time series data with relevant attribute information, (ii) create subsets of time series data for training and/or testing purposes, and/or any other methods.

Inference model manager 102 may provide inferencing services. To provide inferencing services, inference model manager 102 may train a convolutional neural network, obtain a fuzzy kernel, and generate a prediction.

To train a convolutional neural network, inference model manager 102 may (i) obtain time series training data for a quantity, (ii) obtain a convolutional neural network architecture, (iii) perform learning using the convolutional neural network architecture, and/or any other processes to obtain a trained convolutional neural network for the quantity.

To obtain a fuzzy kernel, inference model manager 102 may initialize a first continuous function, and while training the convolutional neural network for the quantity (i) use the first continuous function to perform mathematical operations, (ii) perform learning on the first continuous function, (iii) modify the first continuous function to improve a quality of the first continuous function, and/or any other processes to obtain a fuzzy kernel for the quantity based on the first continuous function.

To generate a prediction, inference model manager 102 may (i) obtain time series data for a quantity, (ii) ingest the time series data into a trained convolutional neural network for the quantity, (iii) perform convolution operations to obtain an output, (iv) normalize the output, (v) propagate the output through the trained convolutional neural network, (vi) update parameters of the fuzzy kernel and/or trained convolutional neural network (e.g., via backpropagation), and/or any other processes to obtain a prediction for the quantity.

Downstream consumers 104 may provide, all or a portion, of the computer-implemented services. When doing so, downstream consumers 104 may obtain predictions and make decisions based on the predictions obtained by inference model manager 102.

Communication system 106 may allow any of include data sources 100, inference model manager 102, and downstream consumers 104 to communicate with one another (and/or with other devices not illustrated in FIG. 1). To provide its functionality, communication system 106 may be implemented with one or more wired and/or wireless networks. Any of these networks may be a private network (e.g., the "Network" shown in FIG. 4), a public network, and/or may include the Internet. Data sources 100, inference model manager 102, and downstream consumers 104 and/or communication system 106 may be adapted to perform one or more protocols for communicating via communication system 106.

Any of (and/or components thereof) data sources 100, inference model manager 102, and downstream consumers 104 and may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1, a system in accordance with an embodiment may forecast changes in quantities over time by using a fuzzy kernel that enables a convolutional neural network to generate predictions based on time series data of samples of the quantities that may have irregular time intervals. Doing so may reduce information loss caused by binning time series data and, consequently, accuracy of predictions based on the time series data may be increased.

Figure 2A:
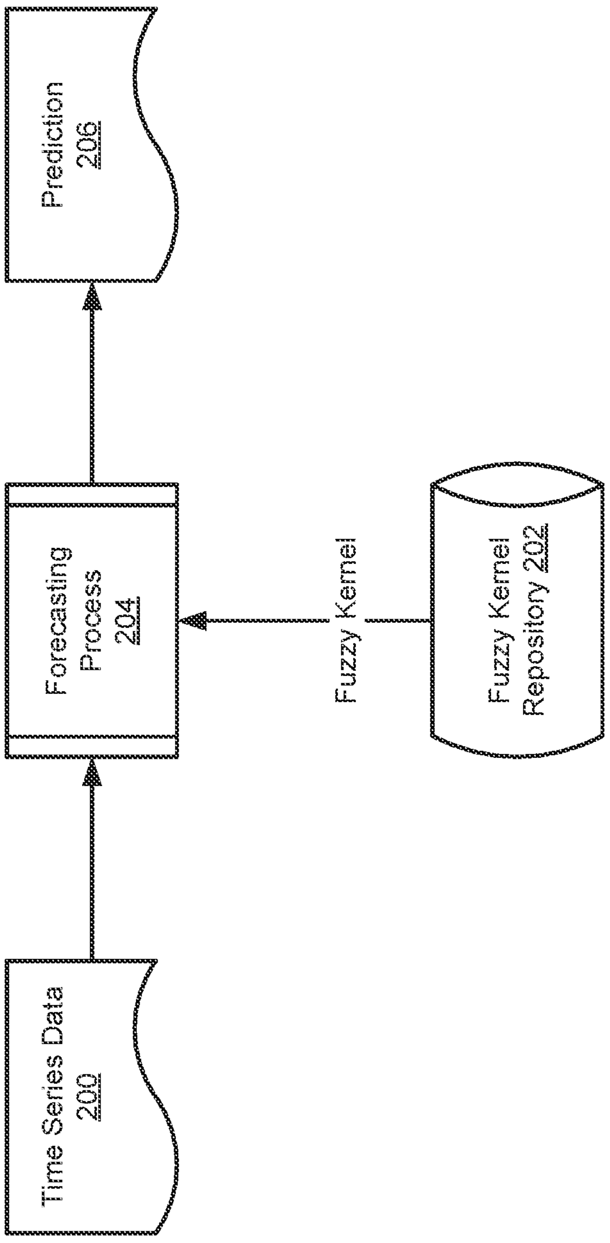
FIGS. 2A-2C show data flow diagrams in accordance with an embodiment.
Figure 2B:
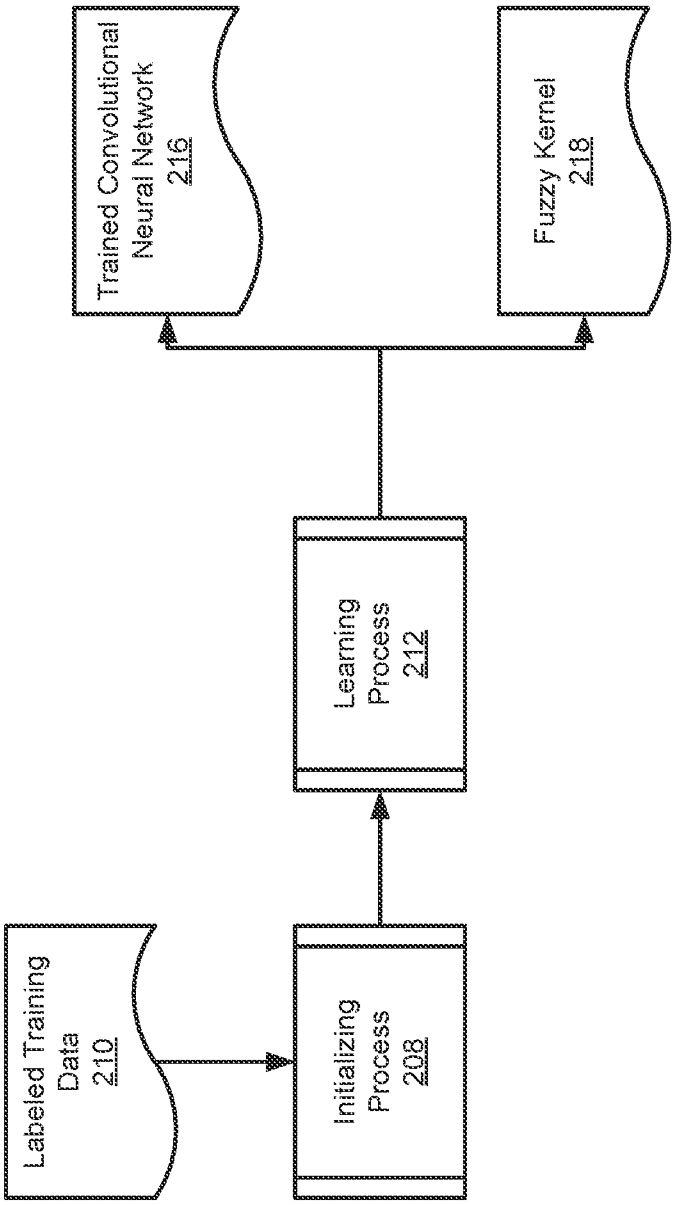
Figure 2C:
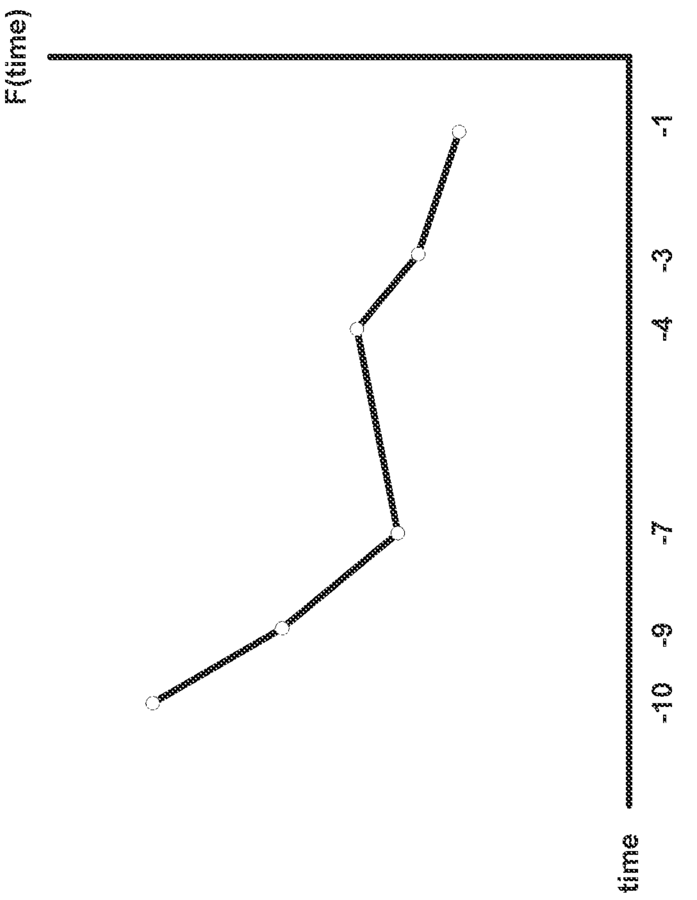

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 206, etc.) is used to represent data structures, a second set of shapes (e.g., 204, 208, etc.) is used to represent processes performed using and/or that generate data, and a third set of shapes (e.g., 202, etc.) is used to represent large scale data structures such as databases.

Turning to FIG. 2A, a first data flow diagram in accordance with an embodiment is shown. The first data flow diagram may illustrate data used in and data processing performed in generating a prediction using a convolutional neural network based on time series data with irregular time intervals. The prediction may indicate a condition impacting a business at a future point in time. The condition impacting the business at the future point in time may include, for example, a change in availability of supply of a product from a supplier.

To generate a prediction for a quantity, forecasting process 204 may be performed. During forecasting process 204, time series data 200 may be ingested, a fuzzy kernel for the quantity may be obtained from fuzzy kernel repository 202, and the time series data may be processed using a trained convolutional neural network to obtain a prediction.

Time series data 200 may include any type and quantity of information regarding (i) time intervals of data points, (ii) values of a quantity, (iii) and/or any other types of information usable to identify patterns and facilitate forecasting of a future value of the quantity. For example, time series data 200 may include time series data regarding supply of the product from a supplier, lead times of the supplier, inventory of a material, product sales and/or other time series data of a quantity. Time series data 200 may include data points with irregular time intervals (e.g., varying durations of time intervals between the data points). The irregular time intervals may be a result of sample collection of the quantity not being in accordance with a schedule. Time series data 200 may be used in forecasting process 204 to identify features in the time series data (e.g., patterns and relationships between a time point and a value of the time series data). Once ingested, time series data 200 may be processed in forecasting process 204.

Fuzzy kernel repository 202 may host any number and type of fuzzy kernels for quantities. Fuzzy kernel repository 202 may organize fuzzy kernels, for example, by (i) storing in a database with corresponding quantities and/or convolutional neural networks, (ii) maintaining the fuzzy kernels in a code repository, and/or any other method. A fuzzy kernel for a quantity may be a continuous function adapted to indicate an effect that a time point has on the quantity at the time point. For example, the fuzzy kernel may be generated during training of a convolutional neural network and stored in fuzzy kernel repository 202. Refer to FIG. 2B for additional information regarding generation of the fuzzy kernel.

Once obtained, time series data 200 may be processed using the trained convolutional neural network for the quantity. To process the time series data, the trained convolutional neural network may (i) perform convolution operations on the time series data using the fuzzy kernel obtained from fuzzy kernel repository 202 in any number and type of layers (e.g., convolution layer, pooling layer, fully connected layer, etc.) of the trained convolutional neural network to obtain outputs, (ii) normalizing, as the outputs are generated, the outputs to obtain normalized outputs, (iii) propagating the normalized outputs through the layers of the trained convolutional neural network, and/or any other processes to obtain prediction 206.

Prediction 206 may include any number and type of information regarding a future value of a quantity. For example, prediction 206 may include (i) a future period of time for which a forecast may be provided, (ii) forecasted values for the quantity over the future period of time, (iii) a confidence level for the forecasted values, and/or any other information. Prediction 206 may be used by downstream consumers in providing computer-implemented services.

Thus, using the data flow shown in FIG. 2A, a prediction may be generated based on time series data that may have irregular time intervals using a fuzzy kernel and a trained convolutional neural network.

Turning to FIG. 2B, a second data flow diagram in accordance with an embodiment is shown. The second data flow diagram may illustrate data used in and data processing performed in training a convolutional neural network and obtaining a fuzzy kernel for a quantity.

To train the convolutional neural network and obtain the fuzzy kernel, initializing process 208 may be performed. During initializing process 208, labeled training data 210 may be ingested, a convolutional neural network architecture may be obtained (not shown), and a first continuous function may be defined. Labeled training data 210 may include any type and number of information regarding (i)

time intervals of data points, (ii) labeled attributes relevant to a quantity, (iii) values for the attributes of the quantity, (iii) and/or any other types of information usable to identify patterns and/or facilitate forecasting of a future value of the quantity. Labeled training data 210 may have irregular time intervals and may be ingested and used in a convolutional neural network without pre-processing (e.g., binning). To ingest labeled training data 210, labeled training data 210 may be retrieved from a database, a repository, and/or any data storage and provided to a convolutional neural network.

The convolutional neural network architecture may be obtained, for example, by (i) selecting a convolutional neural network framework (e.g., AlexNet, VGGNet, ResNet, Inception, etc.), (ii) defining a set of structural parameters (e.g., prior samples, filters, activation function, number of layers, etc.), and/or any other processes.

The first continuous function may be defined, for example, by (i) analyzing the time series training data, (ii) defining terms of an equation (e.g., a polynomial equation) as a function of time, (ii) fitting a function to the times series training data (e.g., regression), and/or any other processes. The result of initializing process 208 may be a convolutional neural network initialized with a first set of parameters, the first continuous function to be used as a fuzzy kernel in the convolutional neural network, and labeled training data 210 ingested as input data to the convolutional neural network.

To train the convolutional neural network to identify patterns in the time series training data, learning process 212 may be performed. During learning process 212, convolution operations may be performed to obtain an output. For example, the convolution operations may be performed by (i) performing a mathematical operation (e.g., multiplication) between a time point of the time series training data and the first continuous function, (ii) identifying a level of quality (e.g., accuracy) compared to a target value of the labeled time series training data, (iii) modifying a parameter of the convolutional neural network architecture and/or the first continuous function to improve the level of quality (e.g., backpropagation), (iv) applying an optimization algorithm (e.g., gradient descent), (v) providing an output to a next layer of the convolutional neural network, and/or any other processes. The result of learning process 212 may be trained convolutional neural network 216 and fuzzy kernel 218. While described as being separate, it would be appreciated that fuzzy kernel 218 may be an integrated component of trained convolutional neural network 216. For example, variables of fuzzy kernel 218 may include weights of trained convolutional neural network 216, and fuzzy kernel 218 may be trained concurrently within trained convolutional neural network 216.

Trained convolutional neural network 216 may include any number and type of information regarding a convolutional neural network architecture usable to forecast future values for a quantity for which a convolutional neural network was trained to identify learnable information for. For example, trained convolutional neural network 216 may include (i) a convolutional neural network framework, (ii) a set of weights and bias, and/or any other parameters of a convolutional neural network obtained from prior training for a quantity. Trained convolutional neural network 216 may be used in forecasting process 204 shown in FIG. 2A to obtain a prediction for a future value for the quantity.

Fuzzy kernel 218 may include information regarding a continuous function adapted to indicate an effect that a time point of times series data has on a quantity at the time point. For example, fuzzy kernel 218 may be polynomial function with certain defined terms that may have been learned via learning process 212. Once obtained, fuzzy kernel 218 may be stored in fuzzy kernel repository 202 and used in forecasting process 204 to perform convolution operations on time series data with irregular time intervals.

Thus, using the data flow shown in FIG. 2B, a convolutional neural network and a fuzzy may be trained for a quantity based on time series data with irregular time intervals.

Turning to FIG. 2C, a third diagram may illustrate an example of time series data with irregular time intervals.

In the graph, the x-axis may indicate time points relative to a current time point, and the y-axis may indicate values or effects of the corresponding time point. Consider a scenario in which data is collected at each occurrence of a product order placement. The product order placement may occur on a need basis that may not be according to a fixed schedule. Relative to the current day, the product order placement may have occurred at various times prior to current day (e.g., 1, 3, 4, 7, 9, and 10 days prior).

Therefore, the point on the x-axis labeled as −1 may correspond to a time point one day prior to the current time point, the point on the x-axis labeled as −3 may correspond to a time point three days prior to the current time point, etc.

A convolutional neural network using a kernel with fixed weights may not be able to accurately compute outputs or accept the time series data with irregular time intervals for operation. However, a fuzzy kernel with a continuous function may be used to compute an effect (e.g., F(time) shown on the y-axis of the graph) that a time point has on a quantity at the time point. Further, the fuzzy kernel may weight an effect of a time point closer to the current time point (e.g., the time point at 3 days prior) more highly than a time point further from the current time point (e.g., the time point at 10 days prior). The higher weight of an effect of a time point closer to the current time point may indicate, for example, that the time point closer to the current time point may provide more relevant information usable to generate a prediction when compared to a time point further from the current time point.

Thus, as shown in FIG. 2C, time series data may have irregular time intervals that may be able to be processed in a convolutional neural network utilizing a fuzzy kernel. The time series data may be used as input to the convolutional neural network without pre-processing the time series data (e.g., adjusting or binning the data to fit required time intervals).

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
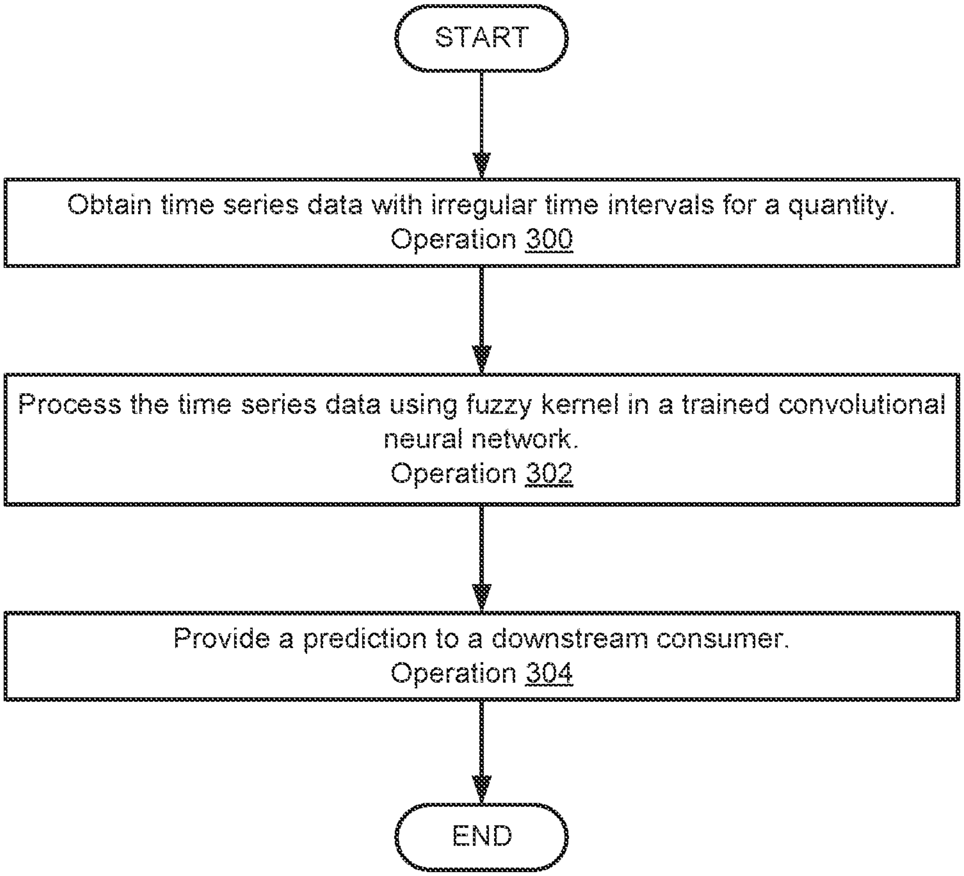
FIGS. 3A-3B show flow diagrams illustrating methods in accordance with an embodiment.
Figure 3B:
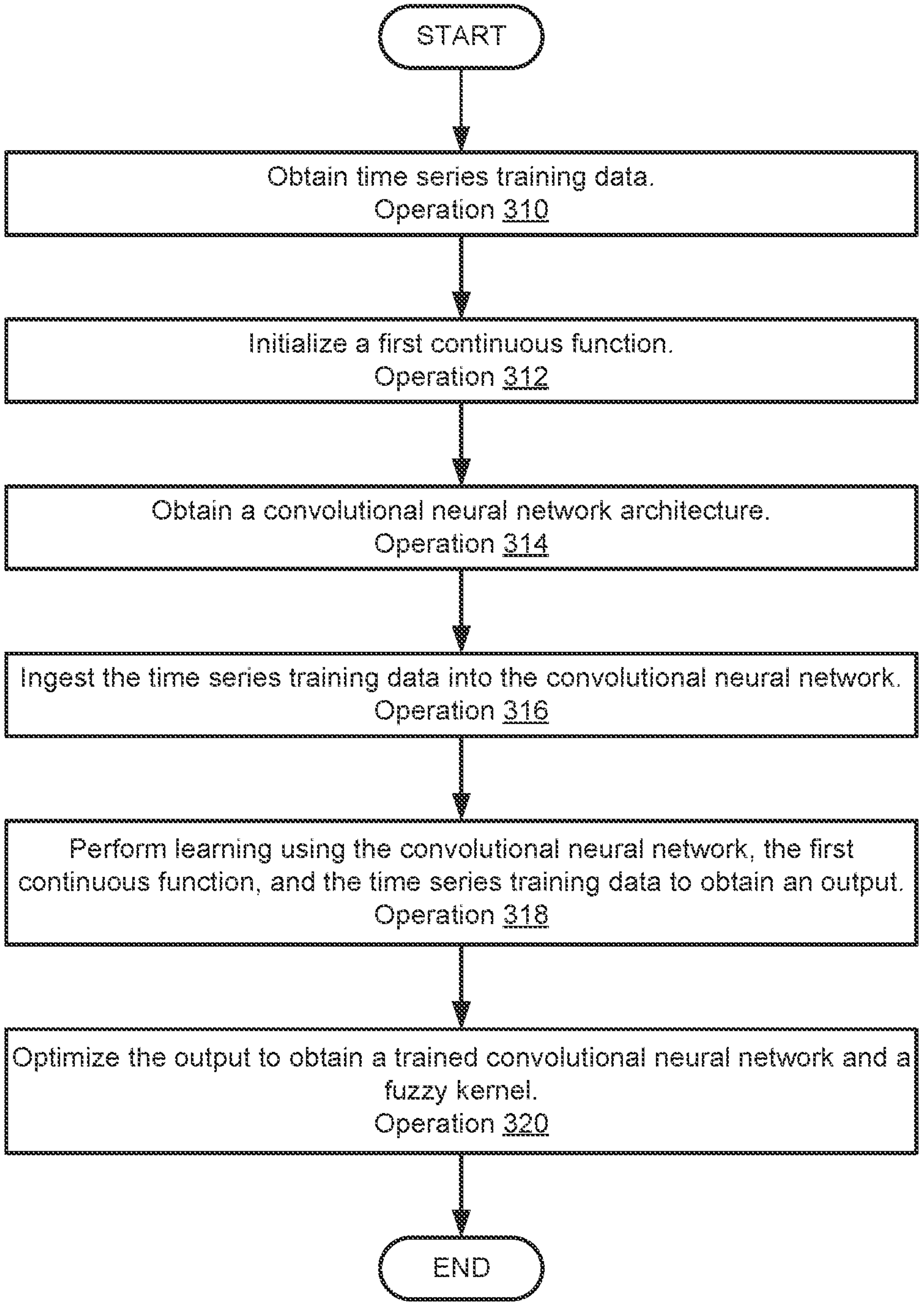

As discussed above, the components of FIG. 1 may perform various methods to forecast a future value of a quantity based on time series data with irregular time intervals. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of forecasting future values of a quantity in accordance with an embodiment is shown. The method may be performed, for example, by any of the components of the system of FIG. 1, and/or other components not shown therein.

At operation 300, time series data with irregular time intervals may be obtained. The time series data may be obtained by (i) receiving the time series data from any number of data sources, (ii) reading from a database, (iii) collecting samples of a quantity over a period of time, and/or any other methods.

At operation 302, the time series data may be processed using a fuzzy kernel in a trained convolutional neural network. The time series data may be processed by (i) ingesting the times series data into the trained convolutional neural network; (ii) performing convolution operations on the time series data to obtain outputs, (iii) normalizing, as the outputs are generated, the outputs to obtain a normalized output, (iv) propagating the normalized outputs through the convolutional neural network to obtain a prediction.

The time series data may be ingested into the trained convolutional neural network, for example, by (i) reading from a connected database, (ii) loading from a data file, and/or any other method.

The convolution operations on the time series data may be performed, for example, by (i) performing mathematical operations (e.g., multiplication) between time points of the input data and the first continuous function, (ii) interpreting results of the mathematical operations (e.g., via a filter map), (iii) extracting features from the results to identify patterns in the input data, and/or any other processes.

The outputs may be normalized, for example, by (i) performing a mean operation on the output to normalize across different sample sizes, (ii) setting a maximum value of a convolution result, and/or any other method to obtain normalized outputs.

The normalized output may be propagated through the convolutional neural network, for example, by (i) providing at least a portion of the normalized outputs of a layer of the convolutional neural network to be inputs for another layer of the convolutional neural network, (ii) forming one or more fully connected layers of the convolutional neural network, and/or any other methods.

At operation 304, the prediction may be provided to a downstream consumer. The prediction may be provided to the downstream consumer by (i) displaying a result in a user interface, (ii) writing to a results table in a database, (iii) providing a report, and/or any other methods.

The method may end following operation 304.

Using the method shown in FIG. 3A, a prediction for future value of a quantity may be provided based on time series data with irregular time intervals using a fuzzy kernel in a convolutional neural network. The use of the fuzzy kernel may allow the convolutional neural network to operate on the time series data without preprocessing the data to fit a certain time interval structure (e.g., binning).

Turning to FIG. 3B, a second flow diagram illustrating a method of training a convolutional neural network and a fuzzy kernel in accordance with an embodiment is shown. The method may be performed, for example, by any of the components of the system of FIG. 1, and/or other components not shown therein.

At operation 310, time series training data for a quantity may be obtained. The time series training data may be obtained by (i) collecting samples of a quantity over a period of time, (ii) obtaining historic time series data for the quantity, (iii) labeling time series data with relevant attribute information, (iv) creating subsets of time series data for training and/or testing purposes, and/or any other methods.

At operation 312, a first continuous function may be initialized. The first continuous function may be initialized by (i) analyzing the time series training data, (ii) defining terms of an equation (e.g., a polynomial equation) as a function of time, (iii) fitting a function to the times series training data (e.g., regression), and/or any other methods.

At operation 314, a convolutional neural network architecture may be obtained. The convolutional neural network architecture may be obtained by (i) selecting a convolutional neural network framework (e.g., AlexNet, VGGNet, ResNet, Inception, etc.), (ii) defining a set of parameters (e.g., prior samples, filters, activation function, number of layers, etc.), and/or any other processes.

At operation 316, the time series training data may be ingested into the convolutional neural network. The time series training data may be ingested by (i) reading from a connected database, (ii) loading from a data file, and/or any other method.

At operation 318, learning may be performed using the convolutional neural network, the first continuous function, and the time series training data. The learning may be performed by (i) performing convolution operations on the time series training data using the first continuous function, (ii) providing an output to a next layer of the convolutional neural network, (iii) identifying a level of quality (e.g., accuracy) compared to a target value of the time series training data, (iv) modifying a parameter (e.g., a weight) of the convolutional neural network architecture and/or the first continuous function to improve the level of quality (v) repeating the convolution operations in any number or order of iterations (e.g., backpropagation), (vi) normalizing the output to a certain scale (e.g., via averaging, clipping, etc.), and/or any other processes.

At operation 320, the output may be optimized to obtain a trained convolutional neural network and a fuzzy kernel. The output may be optimized by (i) applying an optimization algorithm (e.g., gradient descent), (ii) minimizing a level of error from the convolutional neural network, (iii) reducing a likelihood of overfitting, and/or any other processes.

The method may end following operation 320.

Using the method shown in FIG. 3B, a convolutional neural network and a fuzzy kernel may be trained to identify features (e.g., patterns, relationships, etc.) in time series training data with irregular time intervals.

Figure 4:
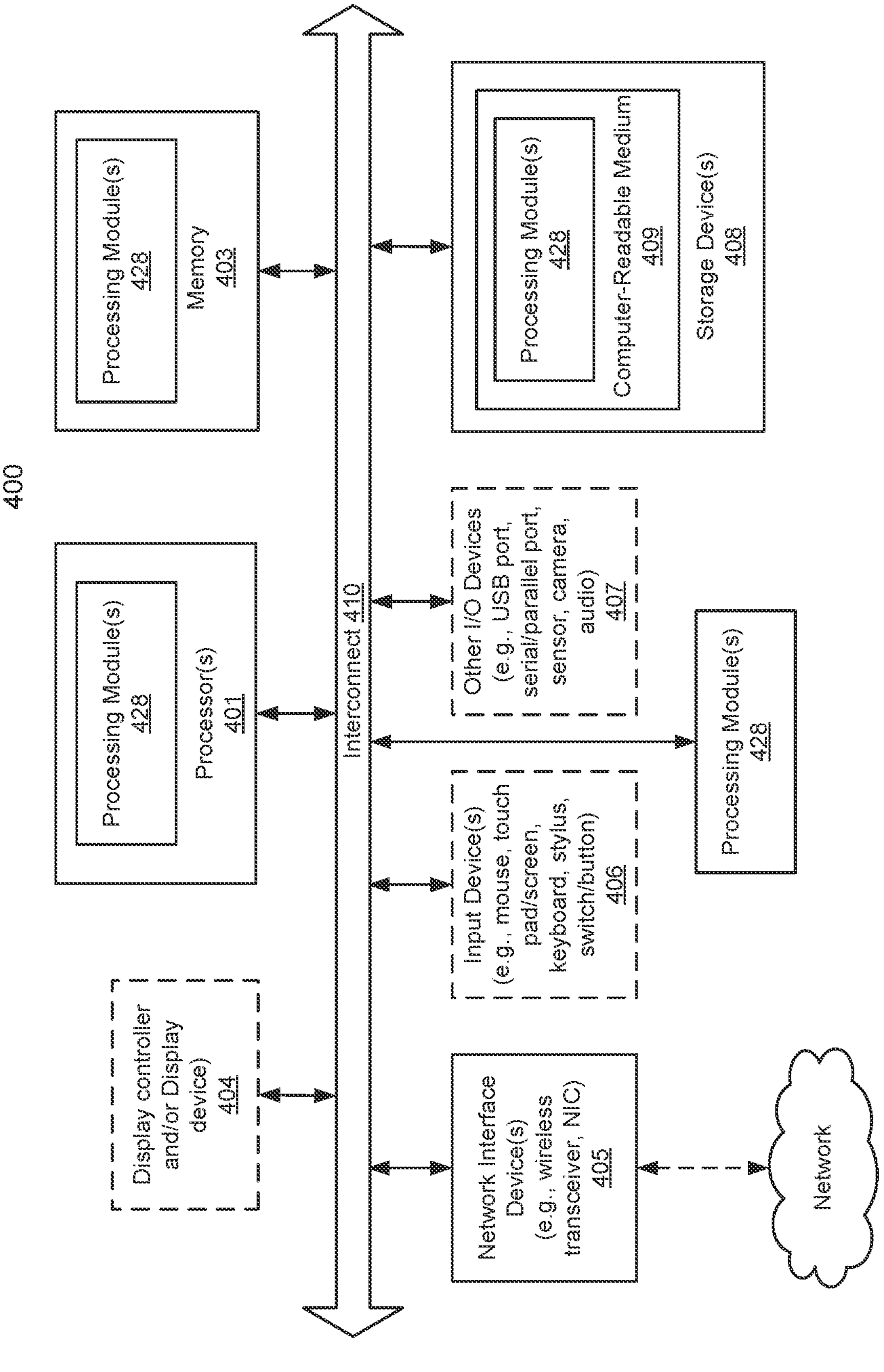
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for forecasting changes in quantities over time, the method comprising:

obtaining training data;

initializing a first continuous function;

after obtaining the training data and initializing the first continuous function, training a convolutional neural network to obtain a trained convolutional neural network, wherein the convolutional neural network is trained using the training data that comprises first irregular time intervals over a first period of time, the training data comprises first time series data having first samples of a first quantity of the quantities, the first samples are collected at the first irregular time intervals, and the first irregular time intervals are used-as is during the training of the convolutional neural network without fitting the first irregular time intervals to a predefined time interval structure, wherein the training of the convolutional neural network further comprises obtaining a convolutional neural network architecture, the convolutional neural network architecture comprising parameters of the convolutional neural network;

ingesting the training data into the convolutional neural network;

performing learning using the convolutional neural network, the first continuous function, and the training data to obtain an output, the output comprising modifications to the parameters of the convolutional neural network and to the first continuous function; and optimizing the output to obtain the trained convolutional neural network and to generate a fuzzy kernel for the trained convolutional neural network;

obtaining, after obtaining the trained convolutional neural network, a request for a future value of the first quantity;

obtaining, in response to obtaining the request, second time series data associated with the first quantity, wherein the second time series data comprises second samples of the first quantity, and the second samples are collected at second irregular time intervals over a second period of time;

processing the second time series data using the trained convolutional neural network to obtain a prediction without fitting the second irregular time intervals of the second time series data to the predefined time interval structure such that the second irregular time intervals are used as-is to obtain the prediction during the processing of the second time series data by the trained convolution neural network; and providing the prediction to a downstream consumer for use in providing computer-implemented services.

2. The method of claim 1, wherein the fuzzy kernel for the first quantity is a continuous function adapted to indicate an effect that a time point has on the first quantity at the time point.

3. The method of claim 2, wherein the fuzzy kernel weights effects for different points in time more highly for the different points in time that are closer to a current time point.

4. The method of claim 1, wherein the prediction indicates a condition impacting a business at a future point in time.

5. The method of claim 4, wherein the condition impacting the business at the future point in time is a change in availability of a supply of a product from a supplier.

6. The method of claim 1, wherein the quantities comprise at least one type of quantity selected from a group of types of quantities consisting of:

lead times of a supplier;

revenue of the supplier;

inventory of a material; and product sales.

7. The method of claim 1, wherein the second irregular time intervals are varying durations of time between collection of the second samples of the first quantity.

8. The method of claim 7, wherein the varying durations of time between collection of the second samples of the first quantity are a result of a collection interval at which the second samples are collected not following a fixed schedule.

9. The method of claim 1, wherein the processing of the second time series data comprises:

ingesting the second time series data into an input layer of the trained convolutional neural network;

performing convolution operations in a plurality of convolution layers of the trained convolutional neural network to obtain outputs from each of the plurality of convolution layers, the convolution operations being a function of the input layer and the fuzzy kernel generated for the trained convolutional neural network;

normalizing, as the outputs are generated, the outputs to obtain normalized outputs, and at least a portion of the normalized outputs also be inputs for some of the plurality of convolution layers during the convolution operations; and propagating the normalized outputs through the plurality of convolution layers to obtain the prediction.

10. The method of claim 9, wherein the fuzzy kernel does not require time series data with fixed sampling for operation.

11. A non-transitory machine-readable medium having instructions stored therein, which when executed by a processor, cause the processor to perform operations for forecasting changes in quantities over time, the operations comprising:

obtaining training data;

initializing a first continuous function;

after obtaining the training data and initializing the first continuous function, training a convolutional neural network to obtain a trained convolutional neural network, wherein the convolutional neural network is trained using the training data that comprises first irregular time intervals over a first period of time, the training data comprises first time series data having first samples of a first quantity of the quantities, the first samples are collected at the first irregular time intervals, and the first irregular time intervals are used-as is during the training of the convolutional neural network without fitting the first irregular time intervals to a predefined time interval structure, wherein the training of the convolutional neural network further comprises obtaining a convolutional neural network architecture, the convolutional neural network architecture comprising parameters of the convolutional neural network;

ingesting the training data into the convolutional neural network;

performing learning using the convolutional neural network, the first continuous function, and the training data to obtain an output, the output comprising modifications to the parameters of the convolutional neural network and to the first continuous function; and optimizing the output to obtain the trained convolutional neural network and to generate a fuzzy kernel for the trained convolutional neural network;

obtaining, after obtaining the trained convolutional neural network, a request for a future value of the first quantity;

obtaining, in response to obtaining the request, second time series data associated with the first quantity, wherein the second time series data comprises second samples of the first quantity, and the second samples are collected at second irregular time intervals over a second period of time;

processing the second time series data using the trained convolutional neural network to obtain a prediction without fitting the second irregular time intervals of the second time series data to the predefined time interval structure such that the second irregular time intervals are used as-is to obtain the prediction during the processing of the second time series data by the trained convolution neural network; and providing the prediction to a downstream consumer for use in providing computer-implemented services.

12. The non-transitory machine-readable medium of claim 11, wherein the fuzzy kernel for the first quantity is a continuous function adapted to indicate an effect that a time point has on the first quantity at the time point.

13. A data processing system, comprising:

a processor; and a memory coupled to the processor to store instructions, which when executed by the processor, cause the processor to perform operations for forecasting changes in quantities over time, the operations comprising:

obtaining training data;

initializing a first continuous function;

after obtaining the training data and initializing the first continuous function, training a convolutional neural network to obtain a trained convolutional neural network, wherein the convolutional neural network is trained using the training data that comprises first irregular time intervals over a first period of time, the training data comprises first time series data having first samples of a first quantity of the quantities, the first samples are collected at the first irregular time intervals, and the first irregular time intervals are used-as is during the training of the convolutional neural network without fitting the first irregular time intervals to a predefined time interval structure, wherein the training of the convolutional neural network further comprises obtaining a convolutional neural network architecture, the convolutional neural network architecture comprising parameters of the convolutional neural network;

ingesting the training data into the convolutional neural network;

performing learning using the convolutional neural network, the first continuous function, and the training data to obtain an output, the output comprising modifications to the parameters of the convolutional neural network and to the first continuous function; and optimizing the output to obtain the trained convolutional neural network and to generate a fuzzy kernel for the trained convolutional neural network;

obtaining, after obtaining the trained convolutional neural network, a request for a future value of the first quantity;

obtaining, in response to obtaining the request, second time series data associated with the first quantity, wherein the second time series data comprises second samples of the first quantity, and the second samples are collected at second irregular time intervals over a second period of time;

processing the second time series data using the trained convolutional neural network to obtain a prediction without fitting the second irregular time intervals of the second time series data to the predefined time interval structure such that the second irregular time intervals are used as-is to obtain the prediction during the processing of the second time series data by the trained convolution neural network; and providing the prediction to a downstream consumer for use in providing computer-implemented services.

14. The data processing system of claim 13, wherein the fuzzy kernel for the first quantity is a continuous function adapted to indicate an effect that a time point has on the first quantity at the time point.

15. The data processing system of claim 14, wherein the fuzzy kernel weights effects for different points in time more highly for the different points in time that are closer to a current time point.

16. The data processing system of claim 13, wherein the prediction indicates a condition impacting a business at a future point in time.

17. The data processing system of claim 16, wherein the condition impacting the business at the future point in time is a change in availability of a supply of a product from a supplier.

18. The non-transitory machine-readable medium of claim 12, wherein the fuzzy kernel weights effects for different points in time more highly for the different points in time that are closer to a current time point.

19. The non-transitory machine-readable medium of claim 11, wherein the prediction indicates a condition impacting a business at a future point in time.

20. The non-transitory machine-readable medium of claim 19, wherein the condition impacting the business at the future point in time is a change in availability of a supply of a product from a supplier.

* * * * *